Patented June 13, 1944

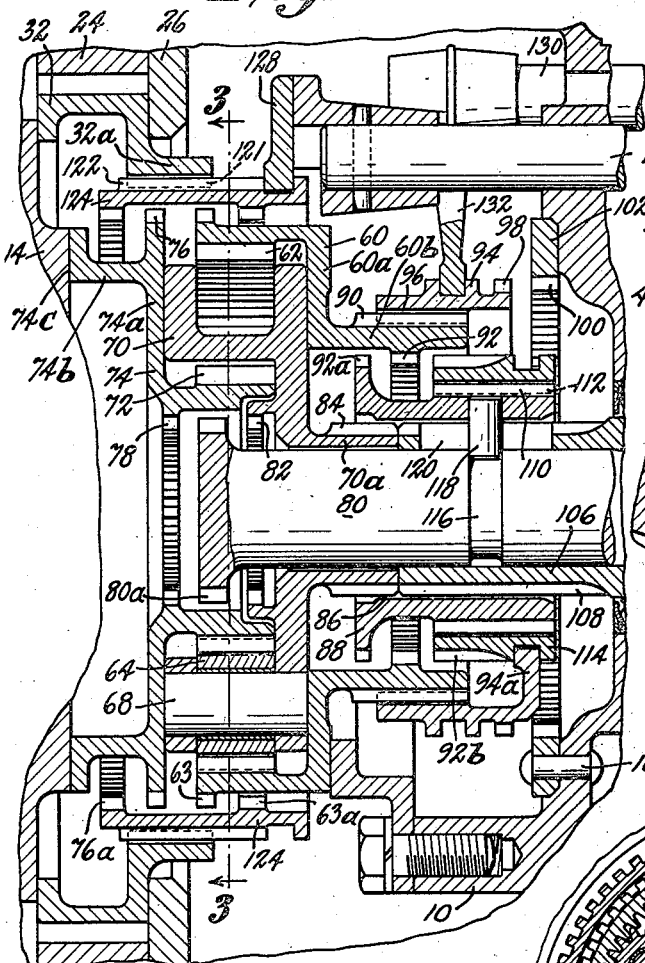

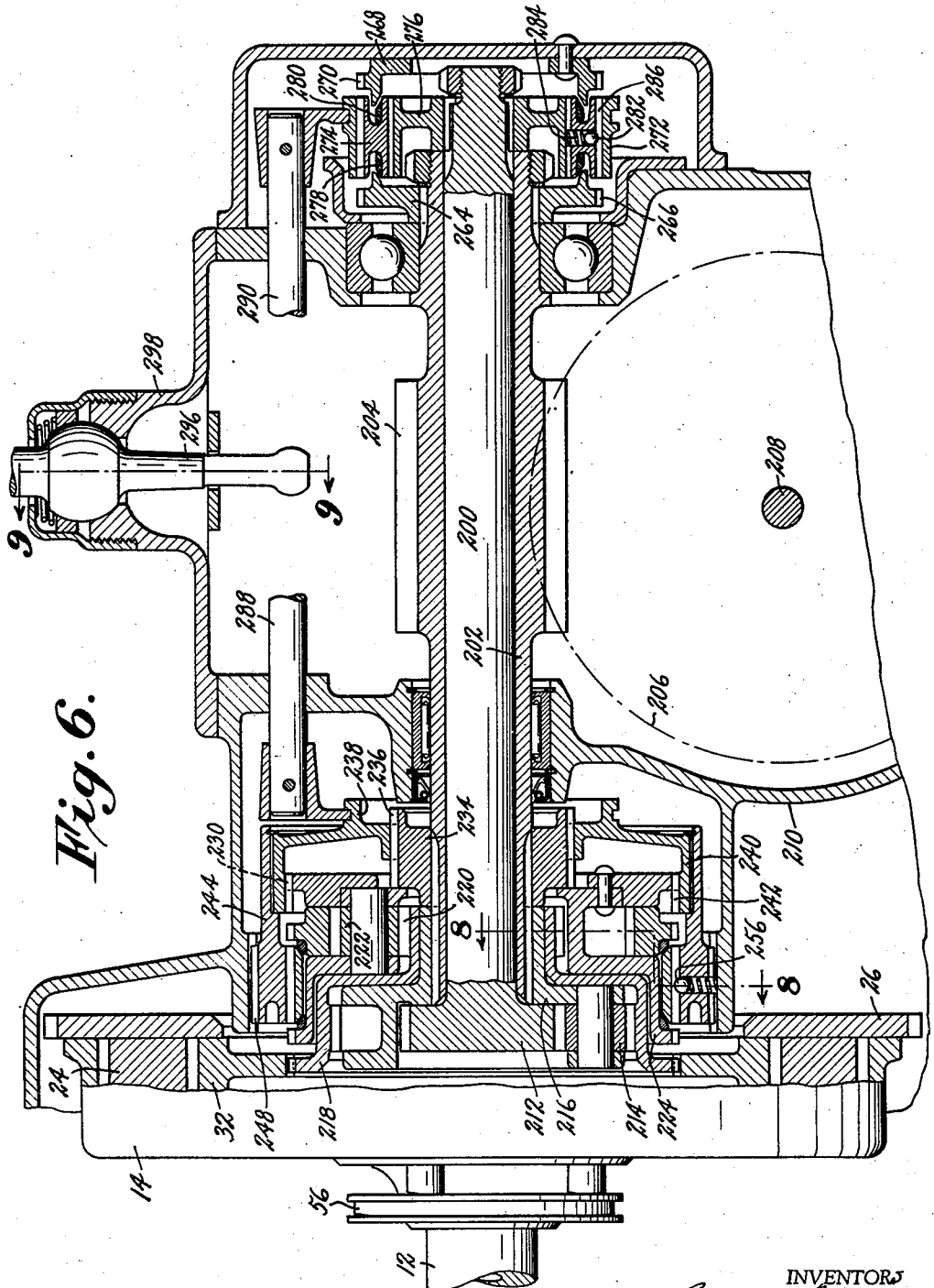

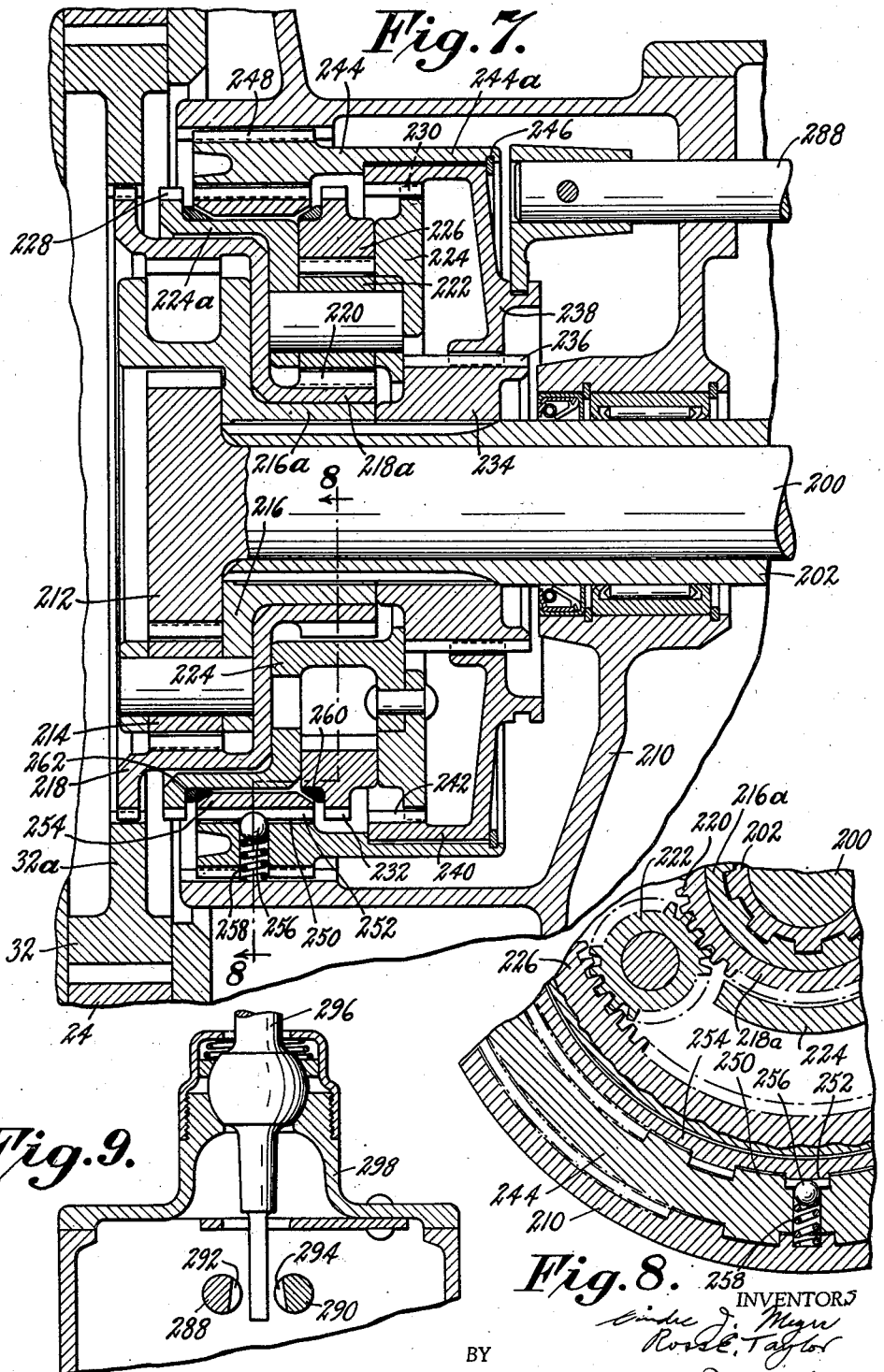

2,351,061

UNITED STATES PATENT OFFICE 2,351,061

TRANSMISSION

André J. Meyer and Ross E. Taylor, Lexington, Ky., assignors to Mawen Motor Corporation, New York, N. Y., a corporation of Delaware Application January 23, 1940, Serial No. 315,148

15 Claims. (Cl. 74—268)

The present invention relates to power transmissions and has particular reference to power transmissions of the change speed type suitable for vehicle drives and providing a plurality of forward speeds inclusive of a direct or one to one speed and a reverse speed.

The general object of the invention is to provide a new and improved form of transmission of the above described character which is simple and extremely compact in its nature and which particularly is compact in axial direction so as to permit drive to be transmitted from an engine to a driving axle, particularly a vehicle axle, with the engine located very close to the axle, this latter being particularly important for vehicles for which front wheel drive is desired and also for vehicles where with rear wheel drive the engine is placed at the rear of the vehicle.

A further object is to provide a transmission of the character under consideration in which the drive in each of the several speed ratios provided is positive in its nature, and a still further object is to provide a complete power transmitting unit in which the transmission is combined in novel manner with a clutch in such a way that the entire unit may advantageously and compactly be mounted together with an engine to secure a complete power plant taking up the minimum amount of space.

In order to attain the above general objects and other and more detailed objects which will hereinafter appear, the invention contemplates the provision of planetary gear mechanism with which there is operatively associated a plurality of positively engaging clutch and brake mechanisms selectively shiftable into and out of engagement to provide different drives through the planetary mechanism to obtain the desired different speed ratios between the driving and the driven elements of the transmission.

For a better understanding of the detailed nature of the invention and the manner in which, it may be carried into effect, reference may best be had to the ensuing description of suitable forms of apparatus embodying the principles of the invention, illustrated in the accompanying drawings forming a part hereof.

In the drawings:

Fig. 2 is a similar section on larger scale showing a part of the mechanism illustrated in Fig. 1;

Fig. 3 is a section taken on the lines 3—3 of Figs. 1 and 2;

Fig. 4 is a section taken on the line 4—4 of Fig. 1;

Fig. 5 is a section taken on the line 5—5 of Fig. 1;

Fig. 6 is a view similar to Fig. 1, showing another form of transmission embodying the invention;

Fig. 7 is a view on a larger scale of a part of the mechanism shown in Fig. 6;

Fig. 8 is a fragmentary cross section taken on line 8—8 of Figs. 6 and 7; and

Fig. 9 is a view taken on the line 9—9 of Fig. 6.

Figure 1:
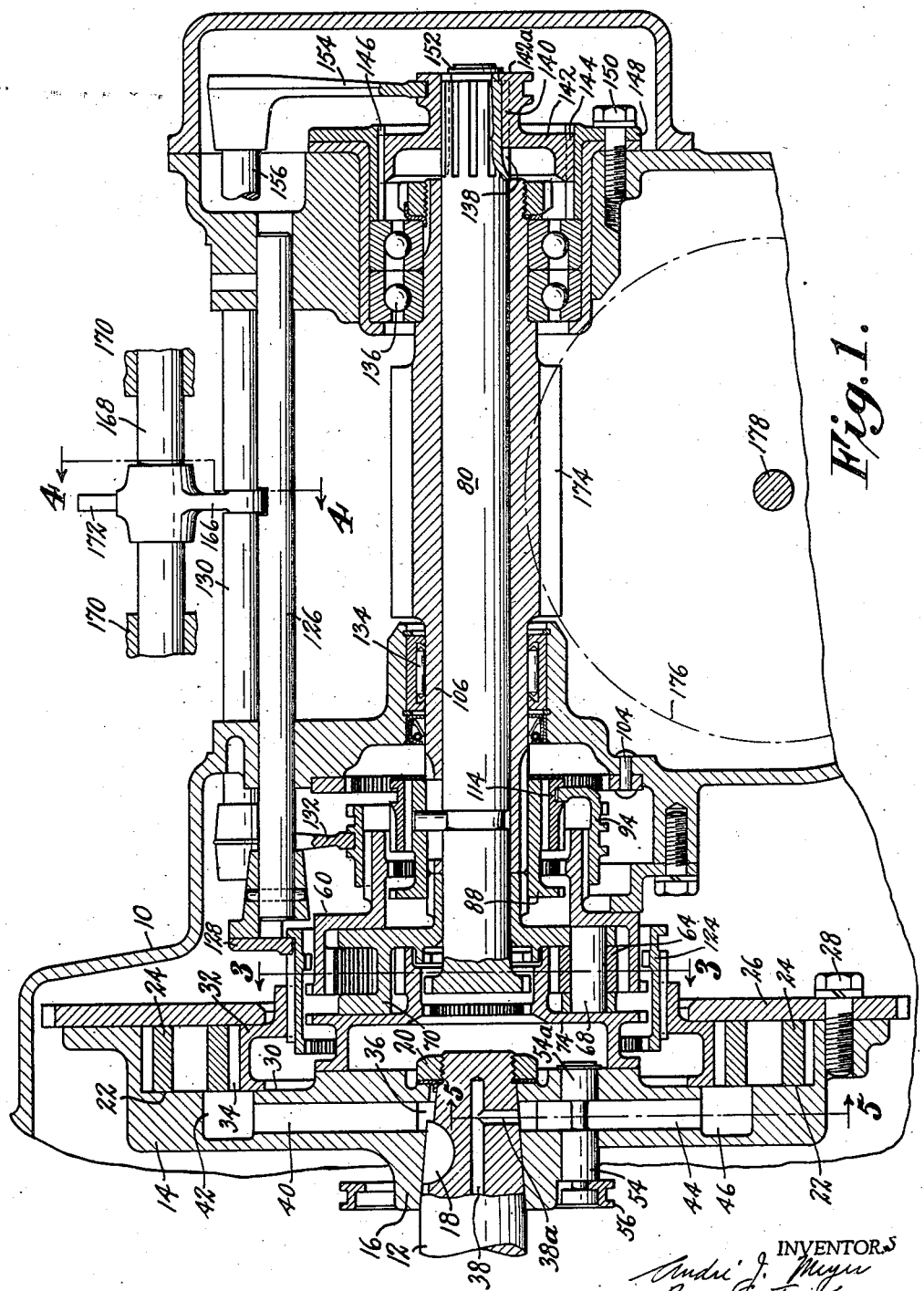
Fig. 1 is a central longitudinal section of one example of transmission and clutch assembly embodying the invention.

Referring now to the drawings, the transmission illustrated comprises a gear case 10 which in the form illustrated is of the usual automotive type, being belled at one end for attachment to the crankcase structure of an engine, the crankshaft of the engine to which the device is attached being indicated at 12.

Before proceeding with the description of the change speed gear, a brief description will first be given of the clutch with which the gearing is associated, the details of which clutch form, per se, no part of the present invention, but which constitute the claimed subject matter of application Serial No. 315,138, filed January 23, 1940, in the name of Willis Merle Carter. The particular clutch structure illustrated herein is, however, particularly advantageously combined with the gearing illustrated to provide a complete power unit which is axially extremely compact in overall dimensions and in which such compactness is obtained by novel cooperative relationship between certain of the elements of the clutch structure and major elements of the gear structure.

In the arrangement shown, the driving member 14 of the clutch is of flywheel like form, having a hub portion 16, keyed as at 18 to the crankshaft 12, and retained thereon by the retaining nut 20.

Member 14 is provided with a plurality of circular recesses 22 peripherally spaced and equidistantly spaced from the axis of the clutch. In each of these recesses there is located a freely rotatable pinion 24 which fits snugly in the recess and is retained axially in place by means of an annular retaining plate 26 secured to member 14 by means of bolts 28 or other suitable securing means. Member 14 is further provided with a central recess 30, the perimeter of which recess intersects the recesses in which the pinions 24 are located. The driven member 32 is situated and freely rotatable in recess 30, the outer perimeter of this member being in the form of a gear 34 of the same diameter as that of the recess in which the gear is located. Member 32 is axially retained in the recess by the inner part of the retaining plate 26 and the teeth of the gear 34 mesh with the pinions 24.

The hub portion of member 14 is provided with an annular channel 36 which is placed, by means of the bore 38 and branch connection 38a in the crankshaft, in communication with the lubricating system of the engine. A series of sets of radial bores extend outwardly from the channel 36, these bores being arranged in pairs and there being one pair for each pinion recess 22. One of such pairs of bores is shown in Fig. 5 and comprises what may be termed an inlet passage 40 which is connected with the recess 22 at one side thereof by an inlet chamber 42 hollowed out of member 14. The other bore of the pair provides what may be termed an outlet passage 44 which is placed in communication with the other side of the recess 22 by means of an outlet chamber 46. Advantageously, although not necessarily, a balancing chamber 48 is provided at the side of the recess 22 opposite the outlet chamber 46, this balancing chamber extending along the length of the recess and being placed in communication with the outlet chamber by means of a passage 50 formed in member 14 at one end of the recess. The radially outer ends of the bores forming the passages 40 and 44 are closed by any suitable means such as the threaded plugs 52.

Each of the outlet passages 44 is controlled by means of a plug type valve 54 mounted to slide axially in the member 14, each of said valves being provided with a balancing head 54a and the several valves being operatively connected to a common shift ring 56 adapted to be moved by any suitable form of shift fork or other control member to simultaneously actuate the several valves. As will be observed from Fig. 1, the outlet passages 44 provide for substantially free flow of fluid therethrough when the valves are in the position shown in the figure. When the valves are shifted from the position shown to the right as viewed in Fig. 1, flow through these passages will progressively be obstructed until such flow is finally cut off.

The operation of the clutch is as follows, assuming the several passages and recesses to be filled with operating liquid which in this instance would be oil from the lubricating system of the engine.

If the driven member 32 of the clutch is stationary, and the driving member is rotated by the engine in clockwise direction as viewed in Fig. 5, it will be evident from this figure that the several pinions 24 will likewise be rotated in clockwise direction about their own axis. Rotating in this manner, these pinions, meshing with the stationary gear 34, will operate as positive displacement gear pumps drawing liquid from the inlet passages 40 and carrying this liquid around in the tooth spaces of the pinions 24 to be discharged to the outlet passages 44 as the teeth of the pinions come into mesh with the teeth of the gear 34. If the valves 54 are open, the pumping action will result in what may be said to be closed circulation of liquid with respect to each of the pumps and inasmuch as the pinions are freely rotatable in their recesses, a negligible amount of driving force will be transmitted from the driving to the driven member of the clutch.

If now the valves 54 are moved toward closed position, increased resistance to flow of the liquid discharged from the pumps will be produced. This will in turn impose resistance to rotation of the pinions 24 about their own axes, and they will thus act to transmit driving force or torque from the driving to the driven member, the value of this torque increasing as the resistance to discharge of liquid from the pumps increases. When valves 54 are fully closed, the circulation of liquid from the pumps is cut off and the pinions prevented from rotating around their own axes. When they are thus held against rotation they act as direct force transmitting members for transmitting the driving force from the driving to the driven member of the clutch, the latter members under this condition rotating in unison except for such negligible slip as may occur as the result of any turning of the pinions permitted by slight leakage of liquid past the ends of the pinions and between the ends of the gear teeth and the walls of the recesses in which the gears are housed. Since the liquid is a lubricant, however, the gear and pinions may be fitted with close tolerances and the amount of leakage held to a negligible value.

While the pinions may, if desired, be mounted to rotate on spindles, they are preferably permitted to float in their respective recesses in order to provide the simplest possible construction, and in order to eliminate or reduce to a minimum the side thrust on the pinions due to the delivery pressure when the control valves are closed, the balancing chambers 48 are provided.

As will be observed from Fig. 1, the balanced nature of the control valve eliminates axial thrust on the valves due to fluid pressure and consequently, the force necessary to be applied to the shift ring 56 to move it or to hold it in any given position of adjustment is relatively very slight, thus making the clutch extremely easy to control. The number of pinions and associated passages and valves may obviously be varied depending upon the size of the clutch and the amount of power to be transmitted therethrough. Ordinarily, a series of three or four pinions will be employed in a clutch mechanism suitable for usual automotive use.

Referring now more particularly to Figs. 2 and 3, the gearing with which the above described clutch is associated comprises a single planetary gear set consisting of an outer ring gear member 60 having internal gear teeth 62 which mesh with a series of planets 64 having teeth 66. The planets are mounted on suitable pins 68 mounted in a planet carrier 70 and the planet teeth 66 also mesh with the teeth 72 of a central sun gear member 74.

The sun gear member 74 is annular in form and has a radially extending disc-like portion 74a provided at its circumference with a series of teeth 76 forming one part of a positively engaging dog type clutch to be hereinafter more fully described. A portion 74b extends axially from the portion 74a to provide a bearing face 74c adapted to bear against a radial face on the driving member 14 of the clutch and as will be observed from Fig. 2, the member 74 is retained in proper axial position between the clutch driving member 14 and the planet carrier 70.

The sun gear member 74 also is provided with a series of internal teeth 78 which form one of the engaging elements of a positively engaging dog type brake which will be described later.

The planet carrier is provided with a hub portion 70a journaled on a central rotationally stationary shaft 80 and carries a set of internal teeth 82 which form one element of a positively engaging dog type brake.

The hub portion 70a of the carrier 70 has a set of external splines 84 which engage internal splines 86 formed on an annular shift member 88, the latter being mounted to be shifted axially of the gearing.

The ring gear member 60 is of cup-like form, having a radially extending portion 60a, between which and the radially extending portion 74a of the sun gear member the planet carrier 70 is retained, and a hub portion 60b carrying external splines 90 and a set of internal teeth 92, the latter forming one element of still another positively engaging dog clutch. The hub portion 60b carries an axially movable shift member 94 having internal splines 96 engaging the splines 90 on the hub of the ring gear member and is provided at one end with a set of external teeth 98 constituting one element of a positively engaging brake, the other engaging element of which is formed by internal teeth 100 on a ring 102 fixed as by means of rivets 104 to the casing 10.

A sleeve 106, which constitutes the driven element of the transmission, is journaled on the central shaft 80 and at its forward end abuts against the hub portion 70a of the planet carrier. At its forward end the sleeve 106 is provided with a set of external splines 108 which are engaged by the splines 86 of the shift member 88. Splines 86, which also engage splines 84 on the planet carrier in some positions of member 88, operate at such times to provide a direct coupling between the planet carrier and the driven element. The shift member 88 at its forward end is provided with a set of external teeth 92a adapted to mesh with the internal teeth 92 on the ring gear member to provide a positively engaging clutch, and this shift member further is provided with a set of external splines 110 engaging a set of internal splines 112 on a shiftable clutch member 114 engaged by a part 94a of the shift member 94 so as to be axially shiftable with the latter member. The clutch member 114 is provided with a series of external teeth 92b adapted to engage the internal teeth 92 of the ring gear member 60 to form still another positively engaging clutch.

The central shaft 80 is provided with a peripheral groove 116 which receives the inner end of a radially extending pin 118 which projects through a longitudinally extending slot 120 in the driven sleeve 106, the outer end of this pin being situated in a suitable bore in the shift member 88.

Shaft 80, which is axially shiftable, is provided at its forward end with a set of external teeth 80a adapted to selectively engage either the teeth 78 on the sun gear member to provide a positively engaging dog type brake, or teeth 82 on the planet carrier 70 to provide a different positively engaging dog type brake.

The driven member 32 of the main clutch, which constitutes the driving element of the transmission, is provided with a hub portion 32a having a set of internal splines 121 formed thereon which engage external splines 122 formed on a shift member 124 encircling the planetary gear set. The shift member 124 is provided with a set of internal teeth 76a adapted to engage the teeth 76 on the sun gear member 74 to form a positively engaging dog clutch and is further provided with a second set of internal teeth 63a adapted to engage the external teeth 63 on the ring gear member 60 to provide still another positively engaging dog clutch.

Referring now more particularly to Fig. 1, it will be observed that the position of the shift member 124 is controlled by means of a shift rod 126 slidably mounted in the casing 10 and having fixed thereon a shift fork 128 engaging a suitable external groove in the shift member.

The shift member 94 is controlled by a second slidably mounted shift rod 130 carrying a shift fork 132 engaging an external groove in member 94.

The driven sleeve 106 is carried in suitable bearings 134 and 136 mounted in the casing 10 and serves to radially support and locate the central shaft 80 which extends beyond the end of the sleeve. The projecting end of the shaft is splined at 138 to engage internal splines 140 on a shift member 142 having external splines 144 slidably engaging internal splines 146 carried by a mounting member 148 bolted to the casing 10 by means of the bolts 150. The shift member 140 is provided with portions 142a overlying the end of the shaft 80 and is rigidly fixed against axial displacement relative to the shaft by means of a retaining member which may advantageously be in the form of a locking ring 152.

The shift member 142 is engaged by a shift fork 154 carried by a third shift rod 156 slidably mounted in the casing.

The shift rods 126, 130, and 156 are mounted so that their center lines are on the arc of a circle, as illustrated in Fig. 4, and rod 126, which is located between the other two rods, is provided with a transversely extending slot 160 while rod 130 is provided with a similar slot 162 and rod 156 is provided with slot 164. Slots 160, 162, and 164 are arranged to be selectively engaged by means of a selector member 166 of sector-like form, slidably and turnably mounted on shaft 168 which is carried in the cover plate (not shown) for the casing 10, parts of which plate are indicated diagrammatically at 170. The selector member 166 is provided with a suitable knob portion 172 adapted to be connected to any desired form of control member for actuating the selector.

For effecting final drive in a vehicle, the sleeve 106 is, in the embodiment illustrated, provided with a worm 174 adapted to mesh with an axle worm gear 176 for transmitting drive to one or more transversely extending live axles, the center line of which is indicated at 178. The one compact casing 10 may therefore serve to house the clutch, the transmission and the main axle gear.

From Fig. 4 it will be observed that the arrangement of the shift rods and the selector is such that the latter can be moved from the position shown in the figure, which is a neutral position, so as to simultaneously engage the slots in the shift rods 126 and 130, by rocking the selector in counterclockwise direction from the position shown, or to simultaneously engage the shift rods 126 and 156, by rocking the selector in clockwise direction from the position shown.

The operation of the apparatus in order to selectively obtain the various desired drives through the transmission is as follows:

In the position of the parts shown in Figs. 1 and 2, the parts are all in neutral position and it will be observed that the shift member 124 is in engagement only with the driven member of the clutch to which it is splined so that no power is transmitted beyond this shift member. The shift member 88 is in a position such that its internal splines connect the driven sleeve 106 and the planet carrier 70 so that the latter is rotatable with the sleeve. However, none of the clutch forming teeth associated either with this shift member or with the planet carrier are in engagement so that these parts can rotate freely to permit freedom of movement of vehicle wheels or any other driven elements drivingly connected to the sleeve 106.

Let it be assumed now that the transmission is incorporated in a vehicle drive and it is desired to set the gear to provide for forward drive with maximum ratio of speed reduction between the driving and the driven shafts. To effect this, the selector is turned counter-clockwise to engage the shift rods 126 and 130 and is then moved to the right as viewed in Fig. 1 to simultaneously move these two shift rods and the shift members 94 and 124 to the right. This shift connects the shift member 124 to the sun gear member of the gear set through the clutch provided by the teeth 76 and 76a. It also effects engagement of teeth 98 on the shift member 94 with the stationary teeth 100 on the ring 102. Since the shift member 124 is splined to the driven member of the main clutch, power is transmitted to the sun gear when the main clutch is engaged, and since the shift member 94 is splined to the hub of the ring gear, this latter gear is held stationary. Assuming the main clutch to be engaged so that the sun gear is rotated, the drive will be transmitted through this gear to the planet pinions which, rolling on the stationary ring gear, will cause the planet carrier to rotate in the same direction as the sun gear but at greatly reduced speed. Shifting of the member 94 to the right does not operate to shift the member 88 axially, since the axial position of this member is determined by the axial position of the central shaft 80, which under the assumed conditions has not been moved from its neutral position. Therefore, the hub of the planet carrier is drivingly connected to the sleeve 106 by member 88, the splines of which engage both this hub and the sleeve. Forward drive at low speed, which may for convenience be referred to as first speed, is thus effected to the driven element of the transmission.

In order to effect forward speed with a lower ratio of gear reduction, which may be conveniently referred to as second speed, the selector is first returned to neutral position and thereafter rotated from the neutral position in clockwise direction to engage the shift rods 126 and 156. After these rods are engaged they are shifted to the left by means of the selector. This action causes the central shaft 80 to be moved to the left from the neutral position shown, so as to cause engagement between the teeth 80a on the shaft and the internal teeth 78 on the sun gear member 74. The sun gear is thus held against rotation because of the fact that the central shaft is held against rotation through the engagement of the shift member 142 which is splined to the casing.

Shift to the left of the rod 126 causes engagement between the teeth 63a on the shift member 124 and the teeth 63 on the ring gear member 60. Drive is thus transmitted through the shift member 124 from the driven member 32 of the main clutch to the ring gear, and rotation of the latter causes the planets to roll on the fixed sun gear 74 to rotate the planet carrier in the same direction as the ring gear. With the sun gear stationary and the ring gear rotating, the difference in speed of rotation between the ring gear and the planet carrier will be less than the difference in speed of rotation between the sun gear and the planet carrier under the first speed drive conditions, so that under the presently assumed conditions a second speed having less gear reduction is provided. When shaft 80 is shifted to the left it not only engages the sun gear to hold the latter stationary, but through the pin 118 it also moves the member 88 to the left. This member slides axially relative to the clutch member 114, due to the splined connection 110, 112 between these parts, part 114 being retained in its neutral position because of its connection to shift member 94, which is not shifted from neutral position. The only effect of moving the member 88 to the left from its neutral position is to increase the axial length of engagement of its splines with the hub of the planet carrier, this hub remaining splined to the driven sleeve 106 so that the drive transmitted to the planet carrier is transmitted through member 88 to the driven element.

In order to effect direct drive through the transmission at 1:1 speed ratio, the selector, after having been returned to neutral position, is turned counter-clockwise to engage shift rods 126 and 130 and is then moved to the left. This movement causes teeth 63a on the shift member 124 to engage teeth 63 on the ring gear member so as to transmit drive from the main clutch to the latter. Movement of the shift member 94 to the left causes teeth 92b to engage the teeth 92 on the hub of the ring gear member 60 and a direct driving connection between the ring gear member and the sleeve 106 is thus effected through the member 114, which is splined to member 88, the latter in turn being splined to the sleeve 106. Since under this condition the sun gear member is not drivingly connected to any other part or restrained against rotation by engagement with the shaft 80, no interference with the direct driving connection through the transmission is brought about by the planetary gearing, the planet carrier of which rotates in unison with the ring gear because of the connection between the sleeve 106 and the hub of the carrier provided by the splined member 88. With the ring gear and planet carrier rotating in unison, the sun gear will also rotate in unison with the other parts, which it is free to do. Thus, in direct drive, there is no relative rotation between any of the gears of the planetary set, which revolves as a unit.

In order to effect reverse drive, the selector, after being returned to neutral position, is turned in clockwise direction to engage the shift rods 126 and 156 and is thereafter moved to shift these rods to the right. This movement operates to cause the teeth 80a on the rotationally stationary shaft 80 to engage teeth 82 on the planet carrier, thus locking the latter against rotation. Movement of shaft 80 to the right also shifts the splined member 88 to the right so that this member is no longer in engagement with the splines 84 on the hub of the planet carrier, thus permitting the driven sleeve 106 to be rotated while the planet carrier is held stationary by shaft 80.

Movement to the right of the shift rod 126 and its associated shift member 124 effects engagement between the teeth 76 and 76a to transmit drive from the driven member of the main clutch through this shift member to the sun gear member 74. With this gear driven by the source of power and with the planet carrier held stationary, it will be evident that the ring gear member 60 will be caused to rotate in the opposite direction and at reduced speed because of the difference in diameters of the sun and ring gears.

The movement of shaft 80 to the right, which through the section of pin 118 shifts member 88 out of engagement with the hub of the planet carrier, also brings teeth 92a on member 88 into engagement with the internal teeth 92 on the ring gear member 60 and a driving connection is thus established from the ring gear member through the member 88 to the driven sleeve 106, which is turned at reduced speed in reverse direction.

From the foregoing it will be apparent that with the arrangement described, the three forward speeds and reverse common for vehicle drives and including a direct drive forward top speed is provided.

Referring now to the form of transmission show in Figs. 6 to 9, inclusive, the clutch construction is the same as previously described in connection with Fig. 1, the parts being correspondingly numbered, and therefore need not again be described in detail.

In the present form, a central shaft 200 is provided, around which is rotatably mounted the driven sleeve 202 carrying the gear 204 adapted to mesh with the axle gear indicated at 206 mounted to turn about axis 208. As in the embodiment shown in Fig. 1, the transmission and axle gear parts are mounted in a common housing 210.

At its forward end, shaft 200 carries a gear 212 constituting the sun gear of a planetary gear train. This sun gear is in constant mesh with a set of planet pinions 214 mounted in a planet carrier 216. Pinions 214 also mesh with a ring gear member 218 having a radially projecting flange splined to the driven member 32a of the main clutch which constitutes the driving element of the transmission.

The planet carrier 216 is provided with a hub portion 216a splined to the forward end of the driven sleeve 202 and this hub portion of the carrier provides a journal upon which is rotatably mounted the hub portion 218a of the ring gear member 218. This hub portion further provides a sun gear 220 meshing with planet pinions 222 mounted in a second planet carrier 224. The planet pinions 222 mesh with a second ring gear member 226.

The planet carrier 224 has a forwardly projecting cup-like extension 224a which carries a set of external teeth 228 forming part of a positively engaging clutch mechanism, later to be described more fully. This planet carrier also is provided at its rearward end with a set of external teeth 230.

As will be seen from Figs. 6 and 7, the planet carrier 224 has a portion which is U-shaped in cross-section, the arms of this portion serving to axially locate the ring gear 226. This gear carries a set of external teeth 232 forming one of the clutching elements of another positively engaging clutch.

A hub 234 is splined on the driven sleeve 202 rearwardly of the carrier hub 216a. Hub 234 is provided with external splines 236 which are slidably engaged by internal splines on a shift member 238. Member 238 has an outer clyindrical part 240 provided with internal teeth 242 meshing with teeth 230 on planet carrier 224. A second shift member 244 of generally cylindrical form has a portion 244a encircling the portion 240 of the first shift member, the two shift members being rotatable with respect to each other and being rigidly fixed against axial displacement with respect to each other by a retaining ring 246 between which and a suitable shoulder on the member 244 the portion 240 of member 238 is held.

At its forward end the shift member 244 is provided with external splines 248 engaging internal splines on the casing 210. It is further provided with a set of internal splines or teeth 250 (see Fig. 8) engaging external splines 252 on a synchronizing ring 254 which is releasably held against axial displacement with respect to the shift member 244 by means of a ball 256 loaded by means of spring 258. The splines 252 on the synchronizing ring are notched to receive ball 256.

The ends of ring 254 are beveled. One of the beveled ends is adapted to frictionally engage a mating friction ring 260 of suitable material such as bronze or the like secured to the ring gear member 226. The other end of ring 254 is adapted to engage a similar friction ring 262 secured to the planet carrier 224. When ring 254 is in its axially central position, it is out of engagement with both of the friction rings 260 and 262.

Referring now more particularly to Fig. 6, the rearward end of the driven sleeve 202 has splined thereon a clutch member 264 carrying a ring of external clutch teeth 266. The rearward end of the casing has fixed thereto a brake member 268 carrying a ring of external brake teeth 270. Teeth 266 and 270 are on the same diameter and between them there is mounted the shift member 272. The shift member 272 is carried by a synchronizing ring 274 which is internally splined to a carrier 276 which is in turn rigidly fixed to the rearward end of the central shaft 200. The synchronizer ring 274 is provided with beveled friction rings 278 and 280, respectively adapted to engage suitable beveled faces provided on the clutch part 264 and brake part 268, depending upon which direction the synchronizing ring is shifted from its neutral or mid position, in which position the friction rings are out of contact with each other. The teeth or splines on the shift member 272 which engage the splines on the synchronizing ring are adapted to mesh alternatively with teeth 266 or teeth 270 depending upon the direction of shift of the shift member from its mid position.

A ball 282 loaded by spring 284 is adapted to seat in the suitably notched internal teeth 286 on the shift member 272 to releasably hold the synchronizing ring 274 against axial displacement with respect to the shift member 272.

The shift member 238, at the forward end of the transmission, is shifted by means of a shift rod 288 slidably mounted for axial movement in suitable bearings in the transmission casing and the shift member 272 at the rear of the transmission is shifted by means of shift rod 290 likewise mounted in the casing. The shift rods 288 and 290 are arranged parallel to each other and are notched respectively at 292 and 294 (as seen in Fig. 9), to be selectively engaged and shifted axially to the right or left, as viewed in Fig. 6, by means of a shift lever 296 of conventional form carried by the casing cover plate 298.

The operation of this form of the transmission, which like the previously described form provides three forward speeds including a direct drive, and a reverse speed, is as follows:

To obtain forward drive with maximum speed reduction through the transmission, ordinarily referred to as first speed, the shift rod 288 is engaged and shifted to the right from the position shown in Figs. 6 and 7. This shift moves the shift members 238 and 244 to the right and through the medium of the spring loaded ball 256, the synchronizing ring 254 is brought into contact with the friction ring or cone 26 to stop rotation of the ring gear 226. Continued shifting movement toward the right will force the ball 256 out of its notch to bring the internal splines or teeth on the shift member 244 into mesh with the teeth 232 on the ring gear 226. Since the shift member 244 is restrained against rotation by the spines 248 engaging the casing, the ring gear 226 is thus locked against turning movement. With the parts set in this fashion, the power is transmitted from the driving element of the transmission (main clutch element 32) through the member 218 to the sun gear teeth 220. With the ring gear 226 locked against rotation, the rotation of the sun gear 220 causes the planet carrier 224 to rotate in the same direction as the sun gear but at reduced speed. Through the medium of the teeth 230 the planet carrier 224 is rotationally fixed to the shift member 238, which is rotatable relative to the shift member 244, and the power is transmitted through the shift member 238 and hub 234 to the driven sleeve 202.

To obtain forward drive in second gear, that is, with less speed reduction than in first gear, the shift rod 290 is engaged and shifted to the right, after rod 288 has been returned to neutral position. This shift operates to lock the central shaft 200 against rotation, due to the engagement of the shift member 272 with the stationary teeth 270, the synchronizing arrangement operating in the same manner as that described in connection with the synchronizing ring 254. Locking of the central shaft 200 operates to lock the sun gear 212 against rotation and power is transmitted from the ring gear 218 to planets 214, which roll on the stationary sun gear and produce rotation of the planet carrier 216 in the same direction as that of the ring gear 218 but at reduced speed. The hub 216a of this planet carrier is splined directly to the driven sleeve 202 to which the power is transmitted. It will be apparent that the gear reduction in this instance is less than in first speed since in the present instance the planets are rolling on the stationary sun gear of relatively small diameter while in first speed the planets roll on a stationary ring gear of relatively large diameter.

To obtain the third or direct drive forward speed, the shift rod 290 is engaged and shifted to the left. This brings shift member 272 into engagement with the teeth 266 on the clutch member fixed to the rear end of the driven sleeve, the engagement taking place after the usual synchronizing action. This operates to lock the driven sleeve to the central shaft 200. With these parts thus fixed against relative rotation, direct drive is transmitted from the ring gear member 218 to the planets 214, which are restrained against rotation about their own axis. Consequently, the planet carrier 216 is rotated at the same speed as the ring gear member 218 and drive is transmitted directly from the planet carrier to the driven sleeve 202.

For reverse, the shift rod 288 is engaged and shifted to the left after rod 290 is returned to its neutral position. Shifting of rod 288 to the left brings the internal splines or teeth on the shift member 244 into engagement with the teeth 228 on the planet carrier 224, after the parts have been synchronized through the action of the ring 254. The shift member 244 operates to hold the planet carrier 224 stationary and drive is transmitted through the member 218 to the sun gear 220 which rotates the planets 222 about their own axes in the stationary carrier 224. Reverse motion is thus imparted to the ring gear 226. The shift to the left not only brings the shift member 244 into engagement with the teeth 228, but also operates to bring the internal teeth 242 on the shift member 238 into engagement with the teeth 232 on the ring gear 226. Thus, this ring gear 226 is coupled to the shift member 238 and transmits reverse drive to this shift member, from which the reverse drive is transmitted to the driven sleeve 202 through the hub 234.

The embodiment just described, like that described in conjunction with Figs. 1 to 5, thus provides the three forward speeds and reverse common for vehicle drives and including a direct drive forward top speed.

In each of the modifications, positive engagement of the parts is provided for each of the various speeds and the difficulties and disadvantages such as slipping and chattering, usually found in muti-speed transmission arrangements employing gearing where one or another of the elements of the gear mechanism are held against rotation by frictionally engaging brake bands or the like, are eliminated.

The described structures further enable the several available speeds to be obtained selectively through the manipulation of a single selector to four different positions which readily may be arranged to be reached by operation of a single gear lever of the usual kind which is manipulable to the four corner positions of an H-type quadrant of conventional nature.

Because of the relatively very small size and light weight of the parts, they readily may be engaged by a so-called clash shift if that is desired and in the transmission illustrated in Figs. 1 to 5, this type of shift is provided for. It will be noted that in this form of the transmission, all of the available speeds are provided for through the medium of a single planetary gear train having but one sun gear, one ring gear, and one set of planets.

In the form of transmission shown in Figs. 6 to 9, the planetary gear mechanism includes two trains of planetary gears rather than the single train of the form shown in Fig. 1, but by reference to the drawings it will be apparent that the two train form is axially just as compact as the single train form and provides an arrangement in which synchronizers are incorporated so that the shifts to the various different speeds may be made without clashing engagement of positively engaging parts rotating at different speeds.

One embodiment characteristic of both forms of the transmission is particularly to be noted. This characteristic is the provision of the central shaft member passing through the driven element of the transmission which central shaft member provides a stationary reaction member for holding a sun gear stationary in order to obtain a desired speed ratio through the transmission.

The transmission unit as a whole is further particularly advantageous when combined with the specific clutch construction illustrated since it will be apparent that this particularly form of clutch not only provides light weight driven parts having relatively little inertia, but also permits the central portion of the clutch structure to be utilized for the reception of a part of the transmission mechanism, thus providing an exceedingly compact clutch and gear. Also, this type of clutch permits the clutch and transmission to be enclosed in a common housing, receiving its lubrication from the same system as that providing lubrication for the engine. The clutch, being operated by liquid, does not have to be separated from the lubricated parts of the transmission and since the operating liquid is lubricating oil, any liquid which may possibly leak from the clutch may, without harm, leak into the transmission space.

As will further be evident, the transmission is particularly advantageously adapted for unit construction wherein the change speed gear is combined in a single unit with a driving axle structure and gearing, since the spaced bearings for the driven element, which element acts as a locating element for various parts of the transmission including the central shaft and certain of the gear parts, advantageously provide a desirable straddle mounting for the power delivering gear of the transmission which constitutes the driving gear of the axle gear assembly. Thus the axial length from the center line of the axle shaft to the flywheel end of the engine may be made exceedingly short.

From the foregoing it will be evident that many changes in the specific construction and arrangement of parts may be made within the scope of the invention and it is accordingly to be understood that the invention is not to be limited to the structures hereinbefore described by way of example but is to be considered as embodying all forms of structure falling within the scope of the appended claims.

What is claimed is:

1. In a power transmission, a driving element, a driven element, planetary gear mechanism including a sun gear member, a ring gear member and a planet carrying member, each of said members having teeth associated therewith, a casing providing a rotationally stationary abutment, axially shiftable means rotationally fixed with respect to said casing and having teeth thereon, and means for selectively moving the last mentioned means axially to engage the teeth thereon with the teeth of said planet carrying member, with the teeth of said ring gear member, or with the teeth of said sun gear member to maintain the selected member stationary.

2. A power transmission comprising a casing, a driving element, a driven element, said driven element comprising a sleeve rotatably mounted in said casing, planetary gear mechanism including a sun gear member, a planet carrier member and a ring gear member for transmitting power from said driving element to said sleeve, and means for selectively holding each of the members of said gear mechanism against rotation to provide different drives from the driving element to the sleeve, said means including a central shaft extending through said sleeve to engage one of said elements of said gear mechanism.

3. A unit power transmission having a single power input element for transmitting power from an engine to an axle comprising a casing adapted to be secured to the engine, planetary gear mechanism comprising a sun gear, planet gears and a ring gear mounted in said casing to rotate co-axially with the engine shaft, said planet gear meshing only with said ring and sun gears, said planetary gear mechanism including a driven sleeve co-axial with the engine shaft and providing a plurality of speed reductions of different ratio between said power input element and said sleeve, spaced apart bearings for rotatably mounting said sleeve in said casing, said gear mechanism being located in said casing between the engine shaft and the nearest of said spaced apart bearings, and axle gears in said casing, said axle gears including an external gear on the portion of said sleeve between said bearings and a gear meshing therewith and mounted to rotate about an axis at an angle to the axis of said sleeve.

4. A unit power transmission having a single power input element for transmitting power from an engine to an axle comprising a casing adapted to be secured to the engine, planetary gear mechanism comprising a sun gear, planet gears and a ring gear mounted in said casing to rotate co-axially with the engine shaft, said planet gear meshing only with said ring and sun gears, said planetary gear mechanism including a driven sleeve and providing a plurality of speed reductions of different ratio between said power input element and said sleeve, said sleeve being mounted in spaced apart bearings co-axial with the engine shaft, said sleeve extending in overhung relation toward the engine shaft from the nearest one of said bearings, a central shaft member extending through said sleeve and constituting a reaction member for transmitting reaction from said gear mechanism to said casing to obtain one of said speed reductions, said central shaft member being located radially by said sleeve member and portions of said sleeve member and said central shaft member between the engine shaft and the adjacent one of said bearings serving to radially locate certain parts of said planetary gear mechanism, and an external gear on said sleeve member between said bearings for driving an axle gear mounted to rotate about an axis at an angle to the axis of said sleeve.

5. A unit power transmission having a single power input element for transmitting power from an engine to an axle comprising a casing adapted to be secured to the engine, planetary gear mechanism comprising a sun gear, planet gears and a ring gear mounted in said casing to rotate co-axially with the engine shaft, said planetary gear mechanism including a driven sleeve co-axial with the engine shaft and providing a plurality of speed reductions of different ratio between said power input element and said sleeve, spaced apart bearings for rotatably mounting said sleeve in said casing, said gear mechanism being located in said casing between the engine shaft and the nearest of said spaced apart bearings, axle gears in said casing, said axle gears including an external gear on the portion of said sleeve between said bearings and a gear meshing therewith and mounted to rotate about an axis at an angle to the axis of said sleeve, and means including a reaction member passing through said sleeve and engaging, on the side of said axle gears remote from said gear, mechanism for selectively holding said sun gear rotationally stationary to obtain one of said speed reductions.

6. A power transmission including a driving element, a hollow driven element, planetary gearing including sun, planet and ring gears for transmitting power at a plurality of speed reductions from the driving element to the driven element, a rotationally stationary abutment, a reaction member extending through said driven element, said reaction member having fixed thereto a sun gear forming a part of said planetary gearing and means for selectively positively coupling said reaction member to said abutment or to said driven member.

7. A power transmission having a single power input element, a hollow driven element coaxial with the driving element, bearing means for supporting said driven element with a portion thereof extending in overhung relation toward the driving element from said bearing means, planetary gear mechanism including sun, planet and ring gears concentrically mounted around the overhung portion of said driven element providing a plurality of speed reductions of different ratio between said power input element and said driven element, said planet gears meshing only with said sun and ring gears, a rotationally stationary abutment, and means for selectively changing the speed ratio through said gears including a reaction member extending through said driven element, said reaction member having fixed thereto a gear constituting a sun gear of the planetary mechanism, and a brake for selectively positively coupling said reaction member to said abutment.

8. In a power transmission, a driving element, a driven element, a planetary gear mechanism including a sun gear member, a ring gear member and a planet carrying member, each of said members having clutch teeth thereon, a casing providing a rotationally stationary abutment, an axially shiftable member rotationally fixed with respect to said casing and having clutch teeth thereon, means for selectively moving the last mentioned member axially in one direction from a neutral position to engage the teeth thereon with the teeth of said planet carrying member, and in the opposite direction from said neutral position to engage the teeth thereon with the teeth on said ring gear member and means for selectively connecting the clutch teeth on said sun gear member with a stationary abutment.

9. A power transmission comprising a driving element, a driven element, planetary gear mechanism, a plurality of clutches operatively associated with said mechanism and selectively operable to provide a plurality of forward speeds of different ratio and a reverse speed between the driving element and the driven element through said mechanism, means including three separate clutch shifting elements for controlling said clutches, and a common actuating means movable to different positions to engage different selected pairs of said shifting elements while remaining disconnected from the remaining one of said shifting elements whereby to engage the clutches required to selectively obtain any one of said speeds.

10. A power transmission comprising a driving element, a driven element, a single planetary gear train, a plurality of clutches operatively associated with said gear train and selectively operable to provide a plurality of forward speeds of different ratio and a reverse speed between the driving element and the driven element through said gear train, means including three separate clutch shifting elements for controlling said clutches, and a common actuating means movable to different positions to engage different selected pairs of said shifting elements while remaining disconnected from the remaining one of said shifting elements whereby to engage the clutches required to selectively obtain any one of said speeds.

11. A power transmission comprising a driving element, a driven element, a single planetary gear train, a plurality of positively engaging clutches operatively associated with said gear train having parts axially shiftable to engage the clutches, means comprising three different shift members for selectively engaging different clutches to obtain a plurality of forward speeds of different ratio and a reverse speed between the driving element and the driven element through said gear train, three axially movable shift rods each connected to a different one of said shift members, said rods being arranged parallel and adjacent to each other, and an axially and turnably mounted selector mounted to engage different pairs of said shift rods when turned to different positions, whereby to simultaneously shift a selected pair of rods when the selector is moved thereafter axially.

12. A power transmission comprising a driving element, a driven element, a stationary abutment, a single planetary gear train comprising a sun gear, a ring gear and a plurality of planets mounted on a planet carrier, clutch means for connecting the planet carrier to said driven element, and means for selectively connecting either one of said gears to the driven element and the remaining one of the said gears to said abutment.

13. A power transmission including a single driving element, a single hollow driven element, planetary gearing including a sun gear for transmitting power from the driving element to the driven element, a rotationally stationary abutment and means including an axially shiftable reaction member extending through said driven element for selectively coupling said sun gear to said abutment.

14. In a power transmission, a casing providing a reaction absorbing abutment, a driving element, a driven element, a single planetary gear set comprising a ring gear member, a planet system including a planet carrier and an annular sun gear member, a rotationally stationary and axially shiftable central shaft member, brake means associated with said sun gear member and said central shaft member and positively engageable when the central shaft member is shifted in selected direction to hold said sun gear member against rotation, clutch means associated with said driving element and said ring gear member and positively engageable to transmit power from the driving element to the ring gear member and clutch means associated with said planet carrier and said driven element and positively engageable to transmit power.

15. In a power transmission, a driving element, a driven element, planetary gear mechanism including a sun gear member, a ring gear member and a planet carrying member, each of said members having teeth thereon, a casing providing a rotationally stationary abutment, an axially shiftable member rotationally fixed with respect to said casing and having teeth thereon, and means for selectively moving the last mentioned member axially in one direction from a neutral position to engage the teeth thereon with the teeth of said planet carrying member and in the opposite direction from said neutral position to engage the teeth thereon with the teeth on said sun gear member.

ANDRÉ J. MEYER.
ROSS E. TAYLOR.